United States Patent
Zhang et al.

(10) Patent No.: US 12,511,579 B2
(45) Date of Patent: Dec. 30, 2025

(54) METHOD, APPARATUS, AND COMPUTING DEVICE FOR CONSTRUCTING PREDICTION MODEL, AND STORAGE MEDIUM

(71) Applicant: Huawei Technologies Co., Ltd., Shenzhen (CN)

(72) Inventors: Yanfang Zhang, Nanjing (CN); Xudong Sun, Nanjing (CN); Qinglong Chang, Nanjing (CN); Liang Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 573 days.

(21) Appl. No.: 18/148,305

(22) Filed: Dec. 29, 2022

(65) Prior Publication Data

US 2023/0146912 A1 May 11, 2023

Related U.S. Application Data

(63) Continuation of application No. PCT/CN2021/102628, filed on Jun. 28, 2021.

(30) Foreign Application Priority Data

Jun. 30, 2020 (CN) .......................... 202010612047.9

(51) Int. Cl.
G06F 18/20 (2023.01)
G06F 18/22 (2023.01)
G06N 20/00 (2019.01)

(52) U.S. Cl.
CPC ............. *G06N 20/00* (2019.01); *G06F 18/22* (2023.01)

(58) Field of Classification Search
None
See application file for complete search history.

(56) References Cited

U.S. PATENT DOCUMENTS 7,788,195 B1 * 8/2010 Subramanian ......... G06N 20/00
706/20
8,370,280 B1 * 2/2013 Lin .......................... G06N 5/04
706/12

(Continued)

FOREIGN PATENT DOCUMENTS

CN 109905271 A 6/2019
CN 110991658 A 4/2020

OTHER PUBLICATIONS

Romero Francisco et al: "INFaaS: A Model-less Inference Serving System", Sep. 25, 2019 (Sep. 25, 2019), XP093104150, total 15 pages.

*Primary Examiner* — Maikhanh Nguyen
(74) *Attorney, Agent, or Firm* — Slater Matsil, LLP

(57) ABSTRACT

A method, an apparatus, and a computing device for constructing a prediction model, and a storage medium are disclosed, and relate to the field of artificial intelligence technologies. The method includes: obtaining, based on a target dataset of a target prediction scenario and/or scenario information of the target prediction scenario, model search space corresponding to the target prediction scenario; performing model training based on the target dataset and models and hyperparameters that are included in the model search space, to obtain trained prediction models; and obtaining, based on evaluation results of the trained prediction models, a prediction model corresponding to the target prediction scenario. Efficiency of constructing the prediction model can be improved.

20 Claims, 6 Drawing Sheets

(56) References Cited

U.S. PATENT DOCUMENTS

| | | | | |
|---|---|---|---|---|
| 10,496,927 | B2* | 12/2019 | Achin | G06N 20/10 |
| 11,544,136 | B1* | 1/2023 | Pekel | G06N 20/00 |
| 11,580,457 | B2* | 2/2023 | Chen | G06Q 30/0267 |
| 11,593,704 | B1* | 2/2023 | Jenatton | G06F 16/958 |
| 11,823,076 | B2* | 11/2023 | Phan | G06F 16/285 |
| 2015/0339572 | A1* | 11/2015 | Achin | G06N 5/04 |
| | | | | 706/46 |
| 2016/0127195 | A1* | 5/2016 | Ripley | H04L 41/145 |
| | | | | 709/224 |
| 2016/0379244 | A1* | 12/2016 | Kalish | G06Q 30/0242 |
| | | | | 705/14.41 |
| 2017/0243140 | A1* | 8/2017 | Achin | G06F 9/5011 |
| 2018/0060738 | A1* | 3/2018 | Achin | G06N 20/00 |
| 2019/0318202 | A1* | 10/2019 | Zhao | G06F 18/214 |
| 2020/0302234 | A1* | 9/2020 | Walters | G06F 16/9536 |
| 2021/0406346 | A1* | 12/2021 | Shiue | G06N 20/20 |

* cited by examiner

METHOD, APPARATUS, AND COMPUTING DEVICE FOR CONSTRUCTING PREDICTION MODEL, AND STORAGE MEDIUM

CROSS-REFERENCE TO RELATED APPLICATIONS

This application is a continuation of International Application No. PCT/CN2021/102628, filed on Jun. 28, 2021, which claims priority to Chinese Patent Application No. 202010612047.9, filed on Jun. 30, 2020. The disclosures of the aforementioned applications are hereby incorporated by reference in their entireties.

TECHNICAL FIELD

This application relates to the field of artificial intelligence technologies, and in particular, to a method, an apparatus, and a computing device for constructing a prediction model, and a storage medium.

BACKGROUND

With the development of computing technologies, a prediction model is usually for predicting some phenomena that will occur in the future. Therefore, the prediction model needs to be constructed.

In a related technology, during prediction model construction, model search space includes all currently collected machine learning models, and a machine learning model is randomly selected from the model search space. Then, hyperparameter optimization and training are performed on the machine learning model based on sample data. Finally, performance evaluation is performed on a trained prediction model, and whether all the machine learning models in the model search space have been tried is determined. If all the machine learning models have not been tried, a machine learning model is selected from the model search space again for training until all the machine learning models in the model search space have been tried, and a prediction model with a best performance evaluation result is selected as an output. If all the machine learning models have been tried, a prediction model with a best performance evaluation result is selected as an output.

The model search space includes a large quantity of machine learning models, and all the machine learning models are to be trained. Consequently, a large quantity of processing resources need to be consumed to obtain the prediction model, and efficiency of determining the prediction model is low.

SUMMARY

This application provides a method, an apparatus, and a computing device for constructing a prediction model, and a storage medium. In this application, efficiency of determining a prediction model can be improved.

According to a first aspect, a method for constructing a prediction model is provided. The method includes: obtaining, based on a target dataset of a target prediction scenario and/or scenario information of the target prediction scenario, model search space corresponding to the target prediction scenario, where the model search space includes models and hyperparameters; performing model training based on the target dataset and the models and the hyperparameters that are included in the model search space, to obtain trained prediction models; and obtaining, based on evaluation results of the trained prediction models, a prediction model corresponding to the target prediction scenario.

In a solution shown in this application, in the first aspect, the method for constructing a prediction model is performed by a construction device. The construction device may obtain, based on the target dataset of the target prediction scenario and/or the scenario information of the target prediction scenario, the model search space corresponding to the target prediction scenario, and then obtain the trained prediction models based on the target dataset and the models and the hyperparameters that are included in the model search space. The construction device evaluates each trained prediction model, to obtain the evaluation result of each prediction model. The construction device determines, based on the evaluation result of each prediction model, the prediction model corresponding to the target prediction scenario. In this way, the construction device can obtain the model search space corresponding to the target prediction scenario, and there are a small quantity of selectable models in the model search space. Therefore, all model and hyperparameter combinations in the model search space can be quickly trained, to reduce duration for constructing the prediction model and improve efficiency of determining the prediction model.

In a possible implementation, the obtaining, based on a target dataset of a target prediction scenario and/or scenario information of the target prediction scenario, model search space corresponding to the target prediction scenario includes: obtaining initial model search space, where the initial model search space is obtained by analyzing a historical dataset, and the historical dataset is the target dataset of the target prediction scenario, or data in the historical dataset is similar to data in the target dataset; and filtering models and/or hyperparameters in the initial model search space based on the target dataset and/or the scenario information of the target prediction scenario, to obtain the model search space corresponding to the target prediction scenario, where the models in the model search space are all or a part of the models in the initial model search space, and the hyperparameters in the model search space are all or a part of the hyperparameters in the initial model search space; or obtaining, from preset models and hyperparameters based on the target dataset of the target prediction scenario and/or the scenario information of the target prediction scenario, the model search space corresponding to the target prediction scenario.

In the solution shown in this application, the construction device may obtain the initial model search space based on the target dataset, then filter the models and/or the hyperparameters in the initial model search space based on the target dataset and/or the scenario information of the target prediction scenario, and form, by using selected models and/or hyperparameters, the model search space corresponding to the target prediction scenario. Alternatively, the construction device stores the preset models and hyperparameters. The construction device filters the preset models and hyperparameters based on the target dataset and/or the scenario information of the target prediction scenario, and forms, by using selected models and the hyperparameters, the model search space corresponding to the target prediction scenario. In this way, because only the models and the hyperparameters that are related to the prediction scenario are selected, there are the small quantity of selectable models in the model search space. Therefore, all the model and hyperparameter combinations in the model search space can be quickly trained, to reduce the duration for constructing the prediction model and improve the efficiency of determining the prediction model.

In a possible implementation, the model in the model search space is a model that is in the initial model search space and whose feature of an applicable dataset is similar to a first feature of the target dataset, and the hyperparameter in the model search space is a hyperparameter that is in the initial model search space and whose feature of an applicable dataset is similar to the first feature of the target dataset; the model in the model search space is a model that is in the initial model search space and whose information about an applicable scenario is similar to the scenario information of the target prediction scenario, and the hyperparameter in the model search space is a hyperparameter that is in the initial model search space and whose information about an applicable scenario is similar to the scenario information of the target prediction scenario; or the model in the model search space is a model in the initial model search space, where information about an applicable scenario of the model is similar to the scenario information of the target prediction scenario, and a feature of an applicable dataset of the model is similar to a first feature of the target dataset; and the hyperparameter in the model search space is a hyperparameter in the initial model search space, where information about an applicable scenario of the hyperparameter is similar to the scenario information of the target prediction scenario, and a feature of an applicable dataset of the hyperparameter is similar to the first feature of the target dataset.

In the solution shown in this application, the first feature of the target dataset may be all or a part of features of the target dataset. The construction device selects the models and the hyperparameters from the initial model search space based on the target dataset and/or the scenario information of the target prediction scenario, and forms, by using the selected models and the hyperparameters, the model search space corresponding to the target prediction scenario. In this way, only the models and the hyperparameters that are related to the prediction scenario can be selected.

In a possible implementation, the obtaining initial model search space includes: determining, based on the historical dataset, models and hyperparameters that correspond to the target prediction scenario, and forming the initial model search space by using the determined models and hyperparameters; or sending a model obtaining request to a cloud device, where the model obtaining request is for requesting to obtain the initial model search space; and receiving the initial model search space sent by the cloud device.

In the solution shown in this application, the construction device may determine the initial model search space by itself, or may request the initial model search space from the cloud device. In this way, the initial model search space can be obtained more flexibly.

In a possible implementation, the determining, based on a historical dataset, models and hyperparameters that correspond to the target prediction scenario includes: obtaining models and hyperparameters whose features of applicable datasets each are similar to a second feature of the target dataset, and determining the models and the hyperparameters as the models and the hyperparameters in the initial model search space corresponding to the target prediction scenario.

In the solution shown in this application, the construction device may obtain, from the preset models and hyperparameters, the models and the hyperparameters whose features of the applicable datasets each are similar to the second feature of the target dataset. The construction device forms the initial model search space by using the obtained models and hyperparameters. In this way, a part of models and hyperparameters can be first selected based on the target dataset.

In a possible implementation, the second feature of the target dataset and the first feature of the target dataset are a same feature or different features.

In the solution shown in this application, when there is the initial model search space, and the models and/or the hyperparameters in the initial model search space are filtered based on the target dataset, the second feature of the target dataset and the first feature of the target dataset may be the same feature or the different features. When there is the initial model search space, and the models and/or the hyperparameters in the initial model search space are filtered based on the target dataset, the second feature of the target dataset and the first feature of the target dataset are the different features. In this way, because the preset models and the hyperparameters may be filtered based on a large quantity of features of the target dataset, the models and the hyperparameters in the model search space corresponding to the target prediction scenario can be more suitable for the target prediction scenario.

In a possible implementation, the scenario information of the target prediction scenario includes a computing performance requirement and/or a prediction requirement, the computing performance requirement includes one or more of memory information, central processing unit (CPU) information, or an inference speed, and the prediction requirement includes prediction duration and/or a prediction periodicity for performing prediction by using the prediction model corresponding to the target prediction scenario. In this way, the prediction model corresponding to the target prediction scenario can better meet the requirement.

In a possible implementation, the first feature of the target dataset includes category information and/or statistics information, the category information includes one or more of periodicity information, fluctuation information, or sudden change information of a time series in the target dataset, and the statistics information includes one or more of a sampling interval, sampling duration, or a neglected collection status of the time series in the target dataset. In this way, the prediction model corresponding to the target prediction scenario can better meet the requirement.

In a possible implementation, the obtaining, based on evaluation results of the trained prediction models, a prediction model corresponding to the target prediction scenario includes: selecting, from the trained prediction models, a prediction model with an optimal evaluation result, and determining the prediction model as the prediction model corresponding to the target prediction scenario. In this way, the prediction model with optimal performance can be selected for the target prediction scenario.

In a possible implementation, before the performing model training based on the target dataset and the models and the hyperparameters that are included in the model search space, to obtain trained prediction models, the method further includes: obtaining a search policy corresponding to the target prediction scenario, where the search policy includes a model search policy. The performing model training based on the target dataset and the models and the hyperparameters that are included in the model search space, to obtain trained prediction models includes: searching the model search space for the models and the hyperparameters based on the model search policy; and performing model training based on the target dataset and the searched models and hyperparameters, to obtain the trained prediction models.

In this way, selecting models and hyperparameters from the model search space can preferentially obtain a model and a hyperparameter that are more suitable for the target prediction scenario, to improve efficiency of determining the prediction model.

In a possible implementation, the search policy further includes a training policy. The performing model training based on the target dataset and the searched models and hyperparameters, to obtain the trained prediction models includes: performing model training based on the target dataset, the training policy, and the searched models and hyperparameters, to obtain the trained prediction models.

In this way, the search policy further includes the training policy, and the training policy is used during the training, so that the trained prediction models can be quickly obtained, to further improve the efficiency of determining the prediction model.

In a possible implementation, the obtaining a search policy corresponding to the target prediction scenario includes: determining, based on the target dataset, the search policy corresponding to the target prediction scenario; or sending a search policy obtaining request to the cloud device, where the search policy obtaining request is for requesting to obtain the search policy; and receiving the search policy sent by the cloud device.

In the solution shown in this application, the construction device may determine the search policy by itself, and may request to obtain the search policy from the cloud device. Therefore, the search policy can be flexibly obtained.

In a possible implementation, after the obtaining a search policy corresponding to the target prediction scenario, the method further includes: adjusting the search policy based on training experience of training the searched models. In this way, because the search policy can be optimized, the trained prediction models can be quickly obtained.

In a possible implementation, the method further includes: sending, to the cloud device, the prediction model corresponding to the target prediction scenario, the models and the hyperparameters that are used for training the prediction model corresponding to the target prediction scenario, and an identifier of the target prediction scenario. In this way, the construction device sends, to the cloud device, related information of the prediction model corresponding to the target prediction scenario, so that the cloud device can expand a model library and obtain more model construction experience.

In a possible implementation, before the performing model training based on the target dataset and the models and the hyperparameters that are included in the model search space, to obtain trained prediction models, the method further includes: obtaining, based on the target dataset, a data preprocessing algorithm included in the model search space. The obtaining trained prediction models based on the target dataset and the models and the hyperparameters that are included in the model search space includes: preprocessing the target dataset according to the data preprocessing algorithm; and performing model training based on a preprocessed target dataset and the models and the hyperparameters that are included in the model search space, to obtain the trained prediction models.

In this way, the model search space further includes the data preprocessing algorithm, so that a format of data in the target dataset can match the models in the model search space, to increase a speed of obtaining the trained prediction models.

According to a second aspect, a method for constructing a prediction model is provided. The method includes: receiving a model obtaining request sent by a construction device, where the model obtaining request is for requesting to obtain initial model search space corresponding to a target prediction scenario; determining, based on a historical dataset, models and hyperparameters that correspond to the target prediction scenario, where the historical dataset is a target dataset of the target prediction scenario, or data in the historical dataset is similar to data in a target dataset; and sending the initial model search space to the construction device, where the initial model search space includes the models and the hyperparameters that correspond to the target prediction scenario.

In this way, a cloud device may provide the initial model search space for the construction device, and the construction device does not need to perform selection from a large quantity of models and hyperparameters. Therefore, a prediction model can be quickly determined.

In a possible implementation, the determining models and hyperparameters that correspond to the target prediction scenario includes: obtaining models and hyperparameters whose features of applicable datasets each are similar to a second feature of the target dataset, and determining the models and the hyperparameters as the models and the hyperparameters in the initial model search space corresponding to the target prediction scenario. In this way, the initial model search space corresponding to the target prediction scenario can be obtained.

According to a third aspect, this application provides an apparatus for constructing a prediction model. The apparatus includes a plurality of modules, and the plurality of modules execute instructions, to implement the method for constructing a prediction model according to the first aspect.

According to a fourth aspect, this application provides an apparatus for constructing a prediction model. The apparatus includes a plurality of modules, and the plurality of modules execute instructions, to implement the method for constructing a prediction model according to the second aspect.

According to a fifth aspect, this application provides a computing device. The computing device includes a memory and a processor, and the processor executes computer instructions stored in the memory, to enable the computing device to perform the method for constructing a prediction model according to the first aspect.

According to a sixth aspect, this application provides a computing device. The computing device includes a memory and a processor, and the processor executes computer instructions stored in the memory, to enable the computing device to perform the method for constructing a prediction model according to the second aspect.

According to a seventh aspect, a computer-readable storage medium is provided. The computer-readable storage medium stores computer instructions. When the computer instructions in the computer-readable storage medium are executed by a computing device, the computing device is enabled to perform the method for constructing a prediction model according to the first aspect or implement a function of the apparatus according to the third aspect.

According to an eighth aspect, a computer-readable storage medium is provided. The computer-readable storage medium stores computer instructions. When the computer instructions in the computer-readable storage medium are executed by a computing device, the computing device is enabled to perform the method for constructing a prediction model according to the second aspect or implement a function of the apparatus according to the fourth aspect.

According to a ninth aspect, this application provides a computer program product. The computer program product includes computer instructions. When the computer instructions are executed by a computing device, the computing device performs the method for constructing a prediction model according to the first aspect.

According to a tenth aspect, this application provides a computer program product. The computer program product includes computer instructions. When the computer instructions are executed by a computing device, the computing device performs the method for constructing a prediction model according to the second aspect.

According to an eleventh aspect, this application provides a system for constructing a prediction model. The system includes a cloud device and a construction device. The construction device is the apparatus according to the third aspect, and the cloud device is the apparatus according to the fourth aspect.

DETAILED DESCRIPTION OF ILLUSTRATIVE EMBODIMENTS

Figure 1:
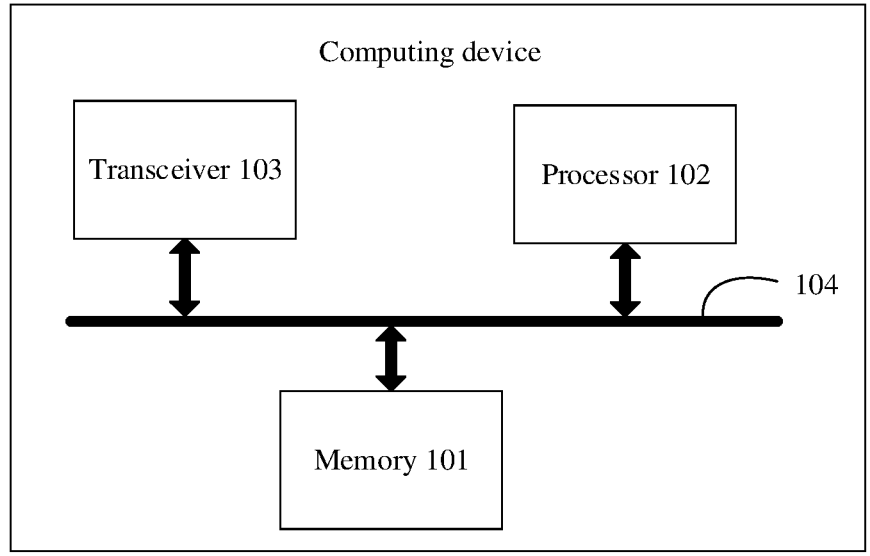
FIG. 1 is a schematic diagram of a structure of a computing device according to an example embodiment of this application.

To make objectives, technical solutions, and advantages of this application clearer, the following further describes implementations of this application in detail with reference to the accompanying drawings.

For ease of understanding embodiments of this application, the following first describes concepts of terms in embodiments of this application.

1. Automated machine learning (AutoML) is a process of automating a prediction model that applies a machine learning model to a real-world problem. In a typical machine learning application, data is appropriately processed, so that the data is amenable for the machine learning model. Then, optimization is performed on the machine learning model and a hyperparameter based on the data and a known machine learning model, to obtain a final prediction model.

2. A time series is a series of data points formed by sorting values of a statistical indicator in time order. A time series forecasting method is to compile and analyze a time series, and perform analogy or extension based on a development process, direction, and trend that are reflected by the time series, to predict a level that may be reached within a next period of time or next several years. The time series forecasting method includes: collecting and organizing historical materials of a social phenomenon, checking and identifying the materials, sorting the materials into a time series, analyzing the time series, searching for a rule that the social phenomenon changes with time, obtaining a particular pattern, and subsequently using the pattern to predict a future situation of the social phenomenon.

3. Hyperparameter: In a context of machine learning, the hyperparameter is a parameter that is set before the learning starts, but is not parameter data obtained through the training. Specifically, the hyperparameter may be an initial value of a parameter in a model, or may be a parameter for controlling a model training process during the learning. For example, the hyperparameter is a learning rate, an iteration step, or the like.

With the development of network technologies and computing technologies, a carrier and a user have increasing requirements for prediction of various content. Currently, a large quantity of prediction models have been accumulated, but there are continuous prediction requirements for different content in different prediction scenarios. Therefore, a method for constructing a prediction model needs to be provided, to automatically select an optimal model and hyperparameter for different prediction duration, so as to quickly generate prediction models in various prediction scenarios and improve efficiency of constructing the prediction model. Based on this, this application provides a method for constructing a prediction model. The method may be performed by an apparatus for constructing a prediction model, and the apparatus is subsequently referred to as a construction apparatus for short. The construction apparatus may be a hardware apparatus, for example, a server or a terminal computing device; or may be a software apparatus (for example, a series of software programs that may be run on a hardware apparatus). For example, the construction apparatus may run on a cloud computing device system (which may include at least one cloud computing device, for example, a server), may run on an edge computing device system (which may include at least one edge computing device, for example, a server or a desktop computer), or may run on various terminal computing devices (for example, a notebook computer or a personal desktop computer).

The construction apparatus may logically be an apparatus including various components. The components in the construction apparatus may be respectively deployed on different systems or servers. Each component of the construction apparatus may run on any two of the cloud computing device system, the edge computing device system, and the terminal computing device. The cloud computing device system, the edge computing device system, and the terminal computing device are connected through a communication path, and may perform communication and data transmission with each other.

An embodiment of this application further provides a computing device for constructing a prediction model. FIG. 1 is an example of a diagram of a possible architecture of a computing device 100. The computing device includes a memory 101, a processor 102, a transceiver 103, and a bus 104. The memory 101, the processor 102, and the transceiver 103 are in communication connection with each other through the bus 104.

The memory 101 may be a ROM, a static storage device, a dynamic storage device, or a RAM. The memory 101 may store computer instructions. When the computer instructions stored in the memory 101 are executed by the processor 102, the processor 102 and the transceiver 103 are configured to perform a method for constructing a prediction model. The memory may further store data. For example, a part of the memory 101 is for storing data required for constructing the prediction model, and is for storing intermediate data or result data in a program execution process.

The processor 102 may use a general-purpose CPU, an application ASIC, a graphics processing unit (GPU), or any combination thereof. The processor 102 may include one or more chips.

The transceiver 103 uses, for example but not for limitation, a transceiver module such as a transceiver, to implement communication between the computing device and another device or a communication network.

The bus 104 may include a path for transmitting information between components (for example, the memory 101, the processor 102, and the transceiver 103) of the computing device.

Embodiments of this application may be applied to a plurality of scenarios. The following provides two possible scenarios.

Figure 2:
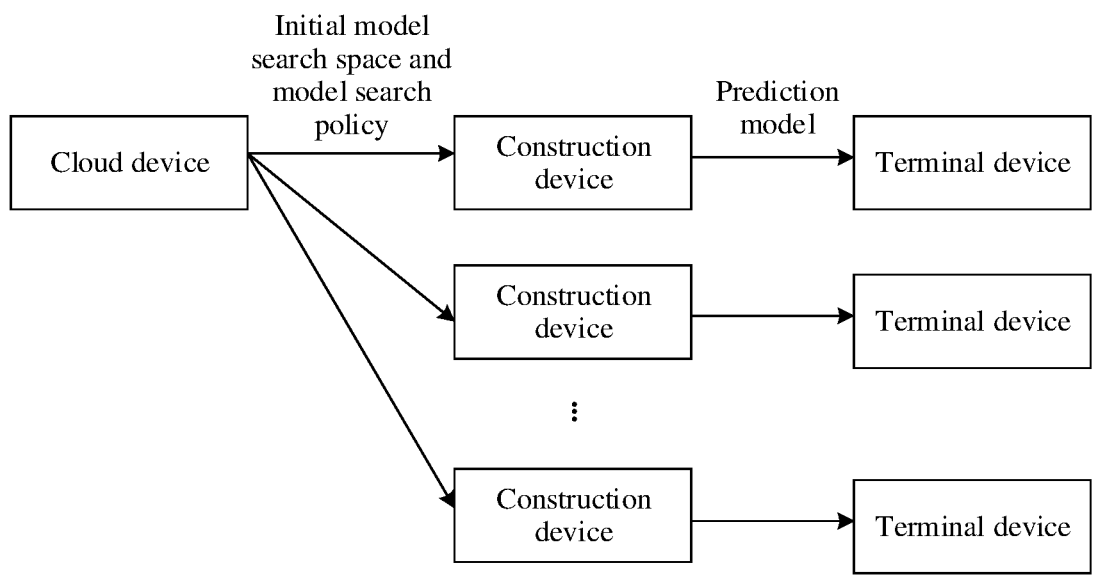
FIG. 2 is a schematic diagram of an application scenario of prediction model construction according to an example embodiment of this application.

Scenario 1: As shown in FIG. 2, devices in a scenario of prediction model construction include a cloud device, a construction device, and a terminal device. There may be a plurality of construction devices, and each construction device is configured to construct prediction models in different scenarios. The cloud device establishes a communication connection to the construction device, and the construction device establishes a communication connection to the terminal device. The cloud device includes a cloud storage device and a cloud computing device. The cloud storage device is configured to store historical datasets, constructed prediction models, and the like in various scenarios. The cloud computing device is configured to: determine initial model search space and a search policy (where the search policy includes a model search policy and a training policy) that are subsequently mentioned, and send the initial model search space and the search policy to the construction device. The construction device is a computing device such as a server. If a method for constructing a prediction model is applied to a network, the terminal device is a router, a switch, a base station, or the like. The construction device is configured to construct a prediction model based on the initial model search space and the search policy. The construction device is further configured to send the constructed prediction model to the terminal device. The terminal device deploys the constructed prediction model to perform prediction. In scenario 1, if a construction apparatus is a software program, the construction apparatus is deployed on the cloud device and the construction device. If a construction apparatus is a hardware device, the construction apparatus is the cloud device and/or the construction device.

Figure 3:
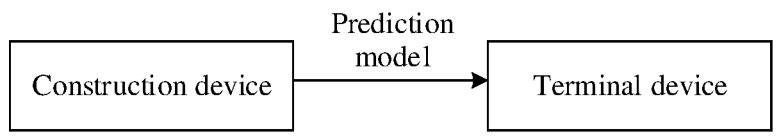
FIG. 3 is a schematic diagram of an application scenario of prediction model construction according to an example embodiment of this application.

Scenario 2: As shown in FIG. 3, devices in a scenario of prediction model construction include a construction device and a terminal device, and the construction device is connected to the terminal device. The construction device is a computing device such as a server. If a method for constructing a prediction model is applied to a network, the terminal device is a router, a switch, a base station, or the like. The construction device is configured to: store historical datasets in various scenarios, construct a prediction model, and then send the constructed prediction model to the terminal device. The terminal device deploys the constructed prediction model to perform prediction. In scenario 2, the construction device determines initial model search space and a search policy that are subsequently mentioned. In scenario 2, if a construction apparatus is a software program, the construction apparatus runs on the construction device. If a construction apparatus is a hardware device, the construction apparatus is the construction device.

In addition, in this embodiment of this application, the initial model search space and the search policy may alternatively be determined by different devices. Specifically, the initial model search space is determined by a cloud device, and the search policy is determined by the construction device. Alternatively, the initial model search space is determined by the construction device, and the search policy is determined by a cloud device.

In addition, in this embodiment of this application, the cloud device may alternatively be used as the construction device, to construct the prediction model, send the prediction model to the terminal device, and the like.

In embodiments of this application, the method for constructing a prediction model may be applied to construction of prediction models of various content. In this embodiment of this application, a time series in a prediction network is used as an example for description, that is, each piece of data in a subsequently mentioned dataset is the time series in the network. For example, the time series in the network may be a time series of a packet loss rate, a time series of a transmission delay, or the like. In addition, in embodiments of this application, "and/or" in the following descriptions indicates three cases. For example, "A and/or B" indicates three cases: A, B, and A and B.

Figure 4:
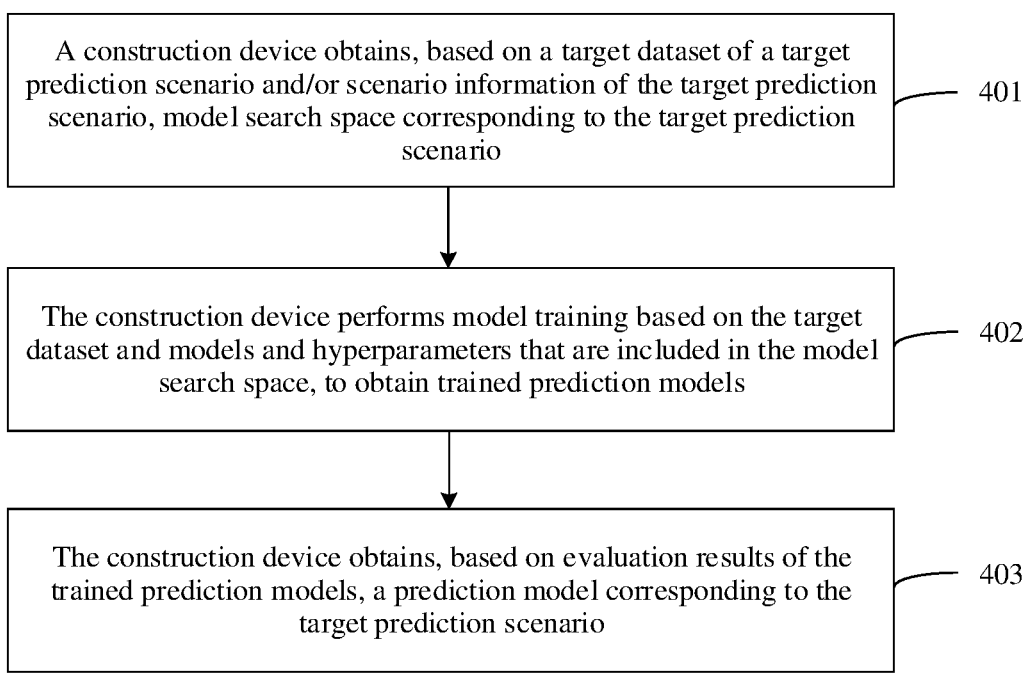
FIG. 4 is a schematic flowchart of a method for constructing a prediction model according to an example embodiment of this application.

The following describes, with reference to FIG. 4, a method for constructing a prediction model according to an embodiment of this application. As shown in FIG. 4, a processing procedure of the method is as follows:

Step 401: A construction device obtains, based on a target dataset of a target prediction scenario and/or scenario information of the target prediction scenario, model search space corresponding to the target prediction scenario.

The target prediction scenario is any scenario. For example, the target prediction scenario is a prediction scenario of network traffic data or a prediction scenario of one or more key performance indicators (KPIs) (where each KPI may correspond to one prediction scenario, or KPIs with common characteristics may correspond to one prediction scenario) of a network packet loss. The target dataset is a dataset corresponding to the target prediction scenario, and includes a large quantity of time series. The model search space includes models and hyperparameters that are related to the target prediction scenario.

In this embodiment, the construction device may obtain, based on the target dataset of the target prediction scenario, the model search space corresponding to the target prediction scenario. Alternatively, the construction device may obtain, based on the scenario information of the target prediction scenario, the model search space corresponding to the target prediction scenario. Alternatively, the construction device may obtain, based on the target dataset and the scenario information of the target prediction scenario, the model search space corresponding to the target prediction scenario.

In a possible implementation, the construction device provides, for a user, an interface for entering the scenario information of the target prediction scenario. The user enters, in the interface, the scenario information of the target prediction scenario into the construction device, so that the construction device obtains the scenario information of the target prediction scenario. The scenario information of the target prediction scenario includes a computing performance requirement and/or a prediction requirement, and the computing performance requirement includes one or more of memory information, CPU information, or an inference speed. Herein, the memory information includes memory usage and/or used memory capacity. The memory usage is a ratio of memory occupied for running a prediction model corresponding to the target prediction scenario to total memory of a deployed device. The used memory capacity is capacity of memory occupied for running the prediction model corresponding to the target prediction scenario. The CPU information includes CPU usage and/or used CPU capacity. The CPU usage is a ratio of a CPU resource occupied for running the prediction model corresponding to the target prediction scenario to a total CPU resource of the deployed device. The used CPU capacity is a quantity of CPU resources occupied for running the prediction model corresponding to the target prediction scenario.

The prediction requirement includes prediction duration and/or a prediction periodicity for performing prediction by using the constructed prediction model, the prediction duration is duration for performing prediction each time, and the prediction periodicity is a prediction interval. For example, that the prediction duration is one month and the prediction periodicity is 10 days means that the prediction is performed every 10 days and each prediction is performed for one month.

Step 402: The construction device performs model training based on the target dataset and the models and the hyperparameters that are included in the model search space, to obtain trained prediction models.

In this embodiment, when the training starts, the construction device searches the model search space for the models and the hyperparameters according to a model search policy (described below). The construction device stores an initial target function, and the target function is for constraining a training target of the prediction model. In addition, the construction device provides, for the user, an interface for entering a training constraint of the prediction model, and the user may additionally enter the training constraint. For example, the initial target function is for constraining a prediction error of the prediction model, and the training constraint additionally entered by the user may be a performance constraint (for example, the prediction model processes at least 50 time series per second, or the memory occupied for running the prediction model cannot exceed a target value). The construction device may form the training target of the prediction model by using the initial target function and the training constraint additionally entered by the user.

Each time the construction device finds the model and the hyperparameter in the model search space, the construction device uses the training target as the constraint, and performs model training based on the target dataset of the target prediction scenario and the model and the hyperparameter found each time, to obtain one trained prediction model. Each time the construction device obtains one prediction model, the construction device determines whether all model and hyperparameter combinations in the model search space have been trained. If all the combinations have been trained, step 403 is performed. If all the combinations have not been trained, step 402 is performed. During prediction model training, a training policy (described below) is used. Thus, whether parameter sharing is supported can be determined. When the parameter sharing is supported, a parameter of another model is shared. In addition, whether an early stop feature (described below) occurs in a training process is determined. If the early stop feature occurs, the training ends. In this case, the construction device searches for a next model and hyperparameter combination for training, to quickly find a most appropriate prediction model.

It should be noted herein that in a process of training a model, if the model is a constructed prediction model, the training is updating of a parameter in the prediction model. If the model is a model framework (namely, a machine learning algorithm), the training is determining of a parameter in the model framework.

Step 403: The construction device obtains, based on evaluation results of the trained prediction models, the prediction model corresponding to the target prediction scenario.

In this embodiment, the construction device evaluates each trained prediction model based on a preset evaluation manner, to obtain the evaluation result of each prediction model. For example, the construction device determines an amount of data that each trained prediction model processes per second, and the amount of data processed per second is the evaluation result of each prediction model. Then, the construction device selects, from the trained prediction models based on the evaluation results of the trained prediction models, the prediction model corresponding to the target prediction scenario.

Optionally, in step 402 and step 403, each time the construction device obtains one trained prediction model, the construction device may evaluate the prediction model. The construction device stores a target evaluation requirement for the prediction model. When it is detected that a prediction model meets the target evaluation requirement, the prediction model is determined as the prediction model corresponding to the target prediction scenario. In this way, it is possible that all the model and hyperparameter combinations in the model search space does not need to be trained. Therefore, a speed of determining the prediction model corresponding to the target prediction scenario can be increased.

In this way, because the construction device can obtain the model search space corresponding to the target prediction scenario, and the selectable models in the model search space are related to the target prediction scenario, there are a small quantity of models in a related technology. Therefore, all the model and hyperparameter combinations in the model search space can be quickly trained, to reduce duration for constructing the prediction model and improve efficiency of determining the prediction model.

The following provides supplementary descriptions for the process shown in FIG. 4.

In this embodiment, step 401 may be implemented in a plurality of manners. The following provides four feasible manners.

Manner 1: The construction device obtains initial model search space from a cloud device, and determines, based on the initial model search space, the model search space corresponding to the target prediction scenario.

In this embodiment, the construction device sends a model obtaining request to the cloud device, where the model obtaining request is for requesting to obtain the initial model search space, the model obtaining request includes the target dataset or a second feature of the target dataset, and the second feature may be all or a part of features of the target dataset. The cloud device stores a large quantity of models (where the model may be a constructed model or a machine learning model (a basic machine learning algorithm)) and hyperparameters, stores, for the constructed model, a feature of a dataset used for training the model, and stores a feature of an applicable dataset for the machine learning model. After the cloud device receives the model obtaining request, the cloud device determines the initial model search space based on the target dataset or the second feature of the target dataset (a determining process is described below). The cloud device sends the initial model search space to the construction device.

The construction device receives the initial model search space sent by the cloud device. The construction device selects models and hyperparameters from the initial model search space based on the scenario information of the target prediction scenario and/or a first feature of the target dataset, to form the model search space corresponding to the target prediction scenario.

Manner 2: The construction device determines initial model search space, and determines, based on the initial model search space, the model search space corresponding to the target prediction scenario.

In this embodiment, the construction device stores a large quantity of models (where the model may be a constructed model or a machine learning model) and hyperparameters, stores, for the constructed model, information about an applicable scenario and a feature of a dataset used for training the model, and stores information about an applicable scenario and a feature of an applicable dataset for the machine learning model. The construction device determines the initial model search space (a determining manner is the same as the determining manner of the cloud device in manner 1), and then selects models and hyperparameters from the initial model search space based on the scenario information of the target prediction scenario and/or a first feature of the target dataset, to form the model search space corresponding to the target prediction scenario.

Optionally, in the foregoing manner 1 and manner 2, the manner of determining the initial model search space is as follows:

Herein, the cloud device is used as an example for description. The cloud device determines the second feature of the target dataset, and selects, from the large quantity of models, models whose second features of applicable datasets each are similar to the second feature of the target dataset. Specifically, the second feature of the dataset used for training the constructed model (a trained model that does not correspond to the target prediction scenario) in the selected models is similar to the second feature of the target dataset, and the second feature of the dataset to which the machine learning model in the selected models is applicable is similar to the second feature of the target dataset. The cloud device determines hyperparameters corresponding to the selected models, and forms the initial model search space by using the selected models and hyperparameters.

Alternatively, the cloud device may construct a plurality of models based on the target dataset and a plurality of machine learning models and hyperparameters, and select, from the plurality of models, machine learning models and hyperparameters that correspond to first N (where N may be 30, or the like) models with optimal evaluation results, to form the initial model search space.

In the foregoing manner 1 and manner 2, a manner in which the construction device filters the models and/or the hyperparameters in the initial model search space is as follows:

The construction device selects models and hyperparameters from the initial model search space, to form the model search space corresponding to the target prediction scenario. Specifically, the construction device selects, from the initial model search space, models whose first features of applicable datasets each are similar to the first feature of the target dataset, and determines hyperparameters corresponding to the models (that is, selects hyperparameters whose first features of applicable datasets each are similar to the first feature of the target dataset). The construction device forms, by using the selected models the hyperparameters corresponding to the models, the model search space corresponding to the target prediction scenario. Specifically, the first feature of the dataset used for training the constructed model in the selected models is similar to the first feature of the target dataset, and the first feature of the dataset to which the machine learning model in the selected models is applicable is similar to the first feature of the target dataset.

Alternatively, the construction device selects, from the initial model search space, models whose scenario information is similar to the scenario information of the target prediction scenario, and determines hyperparameters corresponding to the models (that is, selects hyperparameters whose information about applicable scenarios is similar to the scenario information of the target prediction scenario). The construction device forms, by using the selected models the hyperparameters corresponding to the models, the model search space corresponding to the target prediction scenario.

Alternatively, the construction device selects, from the initial model search space, models whose scenario information is similar to the scenario information of the target prediction scenario and whose first features of applicable datasets each are similar to the first feature of the target dataset, and determines hyperparameters corresponding to the models (that is, selects hyperparameters whose information about applicable scenarios is similar to the scenario information of the target prediction scenario and whose first features of applicable datasets each are similar to the first feature of the target dataset). The construction device forms, by using the selected models the hyperparameters corresponding to the models, the model search space corresponding to the target prediction scenario.

It should be noted herein that the first feature of the target dataset and the second feature of the target dataset may be a same feature or different features. Specifically, when the construction device filters the models and/or the hyperparameters in the initial model search space based only on the scenario information of the target prediction scenario, the first feature of the target dataset and the second feature of the target dataset may be the same, and both may be all or a part of the features of the target dataset. When the construction device filters the models and/or the hyperparameters in the initial model search space based on at least the first feature of the target dataset, the first feature of the target dataset and the second feature of the target dataset are different features. For example, the first feature of the target dataset includes category information and/or statistics information mentioned below. The second feature of the target dataset includes a maximum value, a minimum value, an average value, and the like of data in the dataset.

It should be further noted herein that, when filtering the models and/or the hyperparameters in the initial model search space, the construction device may filter only the models in the initial model search space, use selected model as the models in the model search space, and directly use the hyperparameters in the initial model search space as the hyperparameters in the model search space. Certainly, the construction device may filter only the hyperparameters in the initial model search space, use selected hyperparameters as the hyperparameters in the model search space, and directly use the models in the initial model search space as the models in the model search space.

Manner 3: The construction device may directly determine, based on the scenario information of the target prediction scenario and/or the target dataset, the model search space corresponding to the target prediction scenario.

In this embodiment, the construction device stores a large quantity of models (where the model may be a constructed model or a machine learning model) and hyperparameters, stores, for the constructed model, information about an applicable scenario and a feature of a dataset used for training the model, and stores information about an applicable scenario and a feature of an applicable dataset for the machine learning model. The construction device selects, from the large quantity of models based on the scenario information of the target prediction scenario, models whose scenario information is similar to the scenario information of the target prediction scenario. The construction device determines hyperparameters corresponding to the selected models, and forms the model search space by using the selected models and hyperparameters. Alternatively, the construction device selects, from the large quantity of models based on a feature (which may be a combination of the first feature and the second feature) of the target dataset, models whose features of applicable datasets each are similar to the feature of the target dataset, determines hyperparameters corresponding to the selected models, and forms the model search space by using the selected models and the hyperparameters. Alternatively, the construction device selects, from the large quantity of models based on a feature of the target dataset and the scenario information of the target prediction scenario, models whose scenario information is similar to the scenario information of the target prediction scenario and whose features of applicable datasets each are similar to the feature of the target dataset. The construction device determines hyperparameters corresponding to the selected models, and forms the model search space by using the selected models and hyperparameters.

Manner 4: The construction device requests, from a cloud device, the model search space corresponding to the target prediction scenario. The cloud device may directly determine, based on the scenario information of the target prediction scenario and/or the target dataset, the model search space corresponding to the target prediction scenario (for a determining manner, refer to manner 3). The cloud device sends the model search space to the construction device.

A first feature of the target dataset may include category information and/or statistics information. The category information includes periodicity information, fluctuation information, and sudden change information of each time series in the target dataset. The statistics information includes a sampling interval, sampling duration, and a neglected collection status (namely, a missing collection status) of each time series of the target dataset. The periodicity information may be classified into periodic information and aperiodic information. In other words, each time series is periodic or aperiodic. When the time series is periodic, the periodicity information may further include a periodicity length.

In a possible implementation, in step 403, the construction device determines evaluation results of a plurality of trained prediction models, and then determines, from the plurality of prediction models, a prediction model with an optimal evaluation result. The construction device determines the prediction model as the prediction model corresponding to the target prediction scenario. Specifically, when determining the evaluation results, the construction device weighs accuracy of the models and performance of the models to obtain weighted values, and determines a prediction model with a maximum weighted value as the prediction model with the optimal evaluation result.

In a possible implementation, in this embodiment of this application, before step 402, the construction device may obtain the model search policy and the training policy. An obtaining manner is as follows:

The construction device obtains a search policy corresponding to the target prediction scenario, where the search policy includes the model search policy and/or the training policy.

In this embodiment, the construction device may obtain, based on the target dataset and/or the scenario information of the target prediction scenario, the search policy corresponding to the target prediction scenario. The search policy includes the model search policy and/or the training policy. The search policy indicates a way to quickly and accurately find the optimal prediction model.

Specifically, the model search policy includes a model and hyperparameter selection policy, and the model and hyperparameter selection policy is for selecting the models and the hyperparameters from the model search space. The training policy is for increasing a training speed during training. The training policy may include a hyperparameter (for example, an iteration step), an early stop feature (for example, after an early stop feature occurs during training on a model, the training on the model is stopped, in other words, it is considered that the model cannot be used for training to obtain a prediction model), parameter sharing, low fidelity, and the like. The early stop feature may be that a quantity of iterations reaches a target quantity of times, a parameter update quantity is lower than a threshold, or the like. The parameter sharing means that different models share parameters during training. The low fidelity may mean that a part of data of the target dataset is used for training, to improve a training speed, and the like.

In a possible implementation, in this embodiment of this application, a manner in which the construction device obtains the search policy is as follows:

The construction device determines, based on the target dataset, the search policy corresponding to the target prediction scenario. Alternatively, the construction device sends a search policy obtaining request to the cloud device, where the search policy obtaining request is for requesting to obtain the search policy. The construction device receives the search policy sent by the cloud device.

In this embodiment, the construction device stores a large quantity of model search policies and training policies, and each corresponding model search policy and training policy respectively stores a feature of an applicable dataset. The construction device may determine, based on the target dataset, the model search policy and the training policy that correspond to the feature of the target dataset.

Alternatively, the construction device sends the search policy obtaining request to the cloud device, where the obtaining request includes the target dataset or the feature of the target dataset. The cloud device stores a large quantity of search policies, and stores a feature of an applicable dataset for each search policy. The cloud device determines the model search policy and the training policy (a determining manner is the same as a determining manner of the construction device), and sends the model search policy and the training policy to the construction device.

It should be noted herein that the search policy obtaining request and the model obtaining request mentioned above may be a same request, or may not be a same request. This is not limited in this embodiment of this application. The feature of the target dataset may include the category information and/or the statistics information mentioned above (that is, the feature of the target dataset is the first feature). Certainly, the feature of the target dataset may be the second feature mentioned above. Certainly, the feature of the target dataset may be a union set of the first feature and the second feature.

In addition, in this embodiment of this application, the cloud device simultaneously delivers the model search policy and the training policy to the construction device, or certainly may separately deliver the model search policy and the training policy.

In correspondence to the step in which the construction device obtains the search policy, in an operation of step 402, the construction device uses the model search policy corresponding to the target prediction scenario, to optimize a manner of selecting the models and the hyperparameters in the model search space, so that a most appropriate model and hyperparameter are preferentially selected. In addition, in a training process, the training policy is used for improving training performance (for example, training of some models is ended in advance), so that the training speed can be further increased.

In a possible implementation, the construction device may further adjust the search policy, and a manner is as follows:

The construction device adjusts the search policy based on training experience of training the searched models.

In this embodiment, when training the models in the model search space, the construction device adjusts the search policy based on the training experience of training the models. For example, when several models in the model search space are trained, if evaluation results of the several models are poor, and a feature (namely, the early stop feature) occurs in a training process of the several models, the feature is added to the training policy. When the feature occurs again in a subsequent training process of another model, the training may be immediately ended. In a subsequent model training process, an adjusted search policy is used. For another example, when a model in the model search space is trained, if an evaluation result of the model is poor, a type of the model is added to the model search policy, and subsequently, a model whose type is different from the type of the model is preferentially selected from the model search space. In this way, because the search policy can be adjusted, the training speed can be increased.

In a possible implementation, after step 403 (constructing the prediction model), the construction device sends, to the cloud device, the prediction model corresponding to the target prediction scenario, the models and the hyperparameters that are used for training the prediction model corresponding to the target prediction scenario, and an identifier of the target prediction scenario.

In this embodiment, after constructing the prediction model, the construction device sends, to the cloud device (for example, a cloud storage device), the constructed prediction model, the models and the hyperparameters that are used for training the prediction model, and the identifier of the target prediction scenario. After receiving the constructed prediction model, the models and the hyperparameters that are used for training the prediction model, and the identifier of the target prediction scenario, the cloud device correspondingly stores the constructed prediction model, the models and the hyperparameters that are used for training the prediction model, and the identifier of the target prediction scenario. In this way, it is convenient for the cloud device to expand the trained prediction models, to provide experience for constructing another model.

In addition, the construction device may further provide performance of the constructed prediction model, accuracy of the prediction model, and prediction duration for the cloud device. For example, the performance of the prediction model is that it takes one second to process moo pieces of data. The accuracy of the prediction model is measured by using a plurality of indicators. For example, the accuracy is measured by using an indicator 1 and an indicator 2, the indicator 1 is a mean square error (MSE), and the indicator 2 is an absolute percentage error. The MSE is an average squared difference between predicted values and an actual value within the prediction duration. The absolute percentage error is a ratio of an absolute value of a difference between an actual value and a predicted value to the actual value. The prediction duration indicates a time length in which the prediction model can perform prediction.

In addition, the construction device may further provide, for the cloud device, the target dataset (or the feature of the target dataset) and the search policy that are used for constructing the prediction model. For example, the data is periodic.

As shown in table 1, content provided by the construction device for the cloud device is provided. The content includes a model identifier of the prediction model, a model name of the prediction model, the accuracy of the prediction model, the feature of the target dataset used for constructing the prediction model, the prediction duration, the performance of the prediction model, and the like.

TABLE 1

| Model identifier | Model name | Accuracy Indicator 1 | Accuracy Indicator 2 | Feature of the target dataset | Prediction duration | Performance |
|---|---|---|---|---|---|---|
| 0 | A | 0.95 | 0.90 | Periodic | Long-term prediction: 1 to 12 months | It takes 1 s to process 1000 pieces of data |
| ... | ... | ... | ... | ... | ... | ... |

In a possible implementation, after step 403 (constructing the prediction model), the construction device sends a model deployment message to a terminal device, where the model deployment message indicates a network device that receives the model deployment message to deploy the prediction model.

In this embodiment, after constructing the prediction model, the construction device generates the model deployment message, where the model deployment message carries the constructed prediction model. Then, the construction device sends the model deployment message to the terminal device. The terminal device receives the model deployment message, and parses the model deployment message to obtain the constructed prediction model. The terminal device stores the prediction model. Subsequently, the terminal device predicts to-be-predicted content by using the prediction model.

Optionally, when sending the model deployment message to the terminal device, the construction device may further send the prediction duration and/or the prediction periodicity. Specifically, the construction device may send the prediction duration and/or the prediction periodicity via the model deployment message. If the model deployment message does not include the prediction duration and/or the prediction periodicity, the terminal device may use default prediction duration and/or a default prediction periodicity.

Optionally, before data is input into the prediction model, when the data may need to be preprocessed, the construction device may further send a data preprocessing algorithm to the terminal device. Subsequently, when using the prediction model, the terminal device first preprocesses the data according to the data preprocessing algorithm, and then inputs preprocessed data into the prediction model.

Optionally, when using the prediction model, if the terminal device detects the data, the terminal device may send the data to the construction device, so that the construction device expands the target dataset. To enable the cloud device to obtain a large amount of data, the construction device may send, to the cloud device, the data received from the terminal device.

In a possible implementation, in the model search space, formats and the like of input data required by all the models may be different, or different data formats may affect a training result. Therefore, the model search space may further include the data preprocessing algorithm. For example, the data preprocessing algorithm includes an interpolation supplement algorithm, a data smoothing algorithm, and the like. In this way, the initial model search space provided by the cloud device also includes the data preprocessing algorithm. In this way, in step 401, the model search space obtained by the construction device further includes the data preprocessing algorithm, and correspondingly, the initial model search space also includes the data preprocessing algorithm.

Specifically, in a process of determining the data preprocessing algorithm in the initial model search space, the cloud device stores a plurality of data preprocessing algorithms, a plurality of machine learning models, and a plurality of hyperparameters. The cloud device obtains the target dataset, and determines a plurality of combinations of the data preprocessing algorithm, the machine learning model, and the hyperparameter. The cloud device performs model training based on each combination and the target dataset, to obtain a plurality of models. Then, the cloud device evaluates the plurality of models to obtain a target quantity of models with optimal evaluation results, and includes, in the initial model search space, the combinations of the data preprocessing algorithm, the machine learning model, and the hyperparameter that are used for obtaining the target quantity of models; and/or the cloud device analyzes the target dataset to obtain a feature of the target dataset. Then, the cloud device determines, based on the feature, a constructed model whose feature of an applicable dataset is similar to the feature of the target dataset. Then, the cloud device determines a data preprocessing algorithm used for obtaining the constructed model. The cloud device includes, in the initial model search space, the constructed model, the data preprocessing algorithm, and a hyperparameter corresponding to the constructed model. The feature of the target dataset is the same as the foregoing feature of the target dataset.

In this way, the initial model search space sent by the cloud device to the construction device includes the data preprocessing algorithm. When constructing the prediction model corresponding to the target prediction scenario, the construction device first preprocesses the target dataset according to the data preprocessing algorithm, and then performs model training based on a preprocessed target dataset and the searched models and hyperparameters, to obtain the trained prediction models.

Herein, the cloud device determines the data preprocessing algorithm. Certainly, the construction device may determine the data preprocessing algorithm. A manner in which the construction device determines the data preprocessing algorithm is the same as a manner in which the cloud device determines the data preprocessing algorithm.

Figure 5:
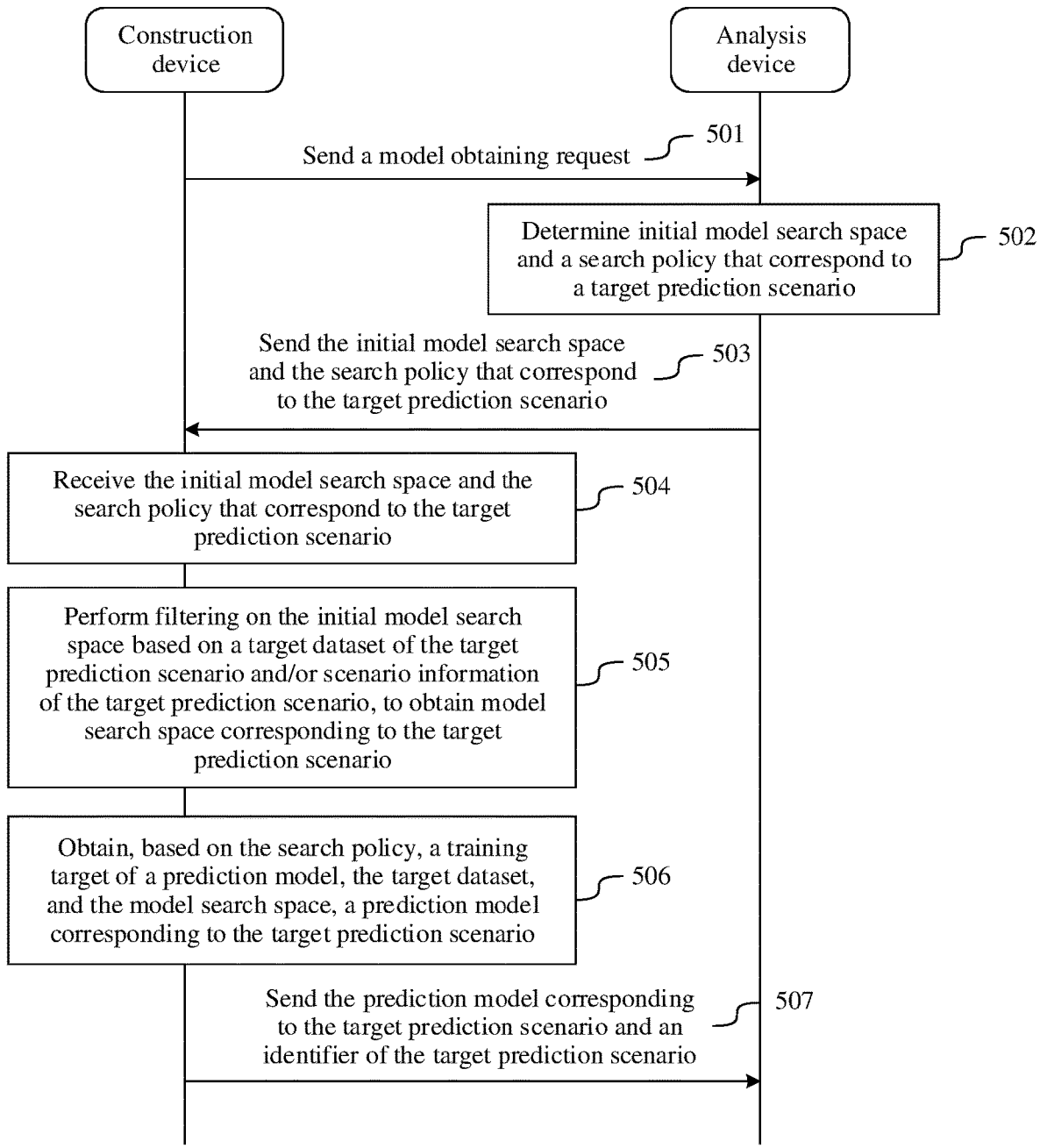
FIG. 5 is a schematic diagram of interaction between a cloud device and a construction device during prediction model construction according to an example embodiment of this application.

In addition, the construction device obtains the initial model search space and the search policy from the cloud device. As shown in FIG. 5, a process of interaction between the cloud device and the construction device is further provided.

Step 501: The construction device sends a model obtaining request to the cloud device (herein, an example in which the model obtaining request and a search policy obtaining request are a same request is used), where the model obtaining request includes a target dataset or a second feature of the target dataset.

Step 502: The cloud device determines, based on the target dataset or the second feature of the target dataset, initial model search space and a search policy that correspond to a target prediction scenario.

Step 503: The cloud device sends, to the construction device, the initial model search space and the search policy that correspond to the target prediction scenario.

Step 504: The construction device receives the initial model search space and the search policy that correspond to the target prediction scenario.

Step 505: The construction device filters models and/or hyperparameters in the initial model search space based on the target dataset of the target prediction scenario and/or scenario information of the target prediction scenario, to obtain model search space corresponding to the target prediction scenario.

Step 506: The construction device obtains, based on the search policy, a training target of a prediction model, the target dataset, and the model search space, a prediction model corresponding to the target prediction scenario.

Step 507: The construction device sends, to the cloud device, the prediction model corresponding to the target prediction scenario, an identifier of the target prediction scenario, and the like.

In this application, models corresponding to the target prediction scenario instead of all machine learning models are obtained. Therefore, in a process of training the prediction model corresponding to the target prediction scenario, a small quantity of models need to be trained, so that processing resources can be saved, and efficiency of constructing the prediction model can be improved. In addition, because models in the model search space are the models related to the target prediction scenario, it is easier to obtain a prediction model with high performance.

Figure 6:
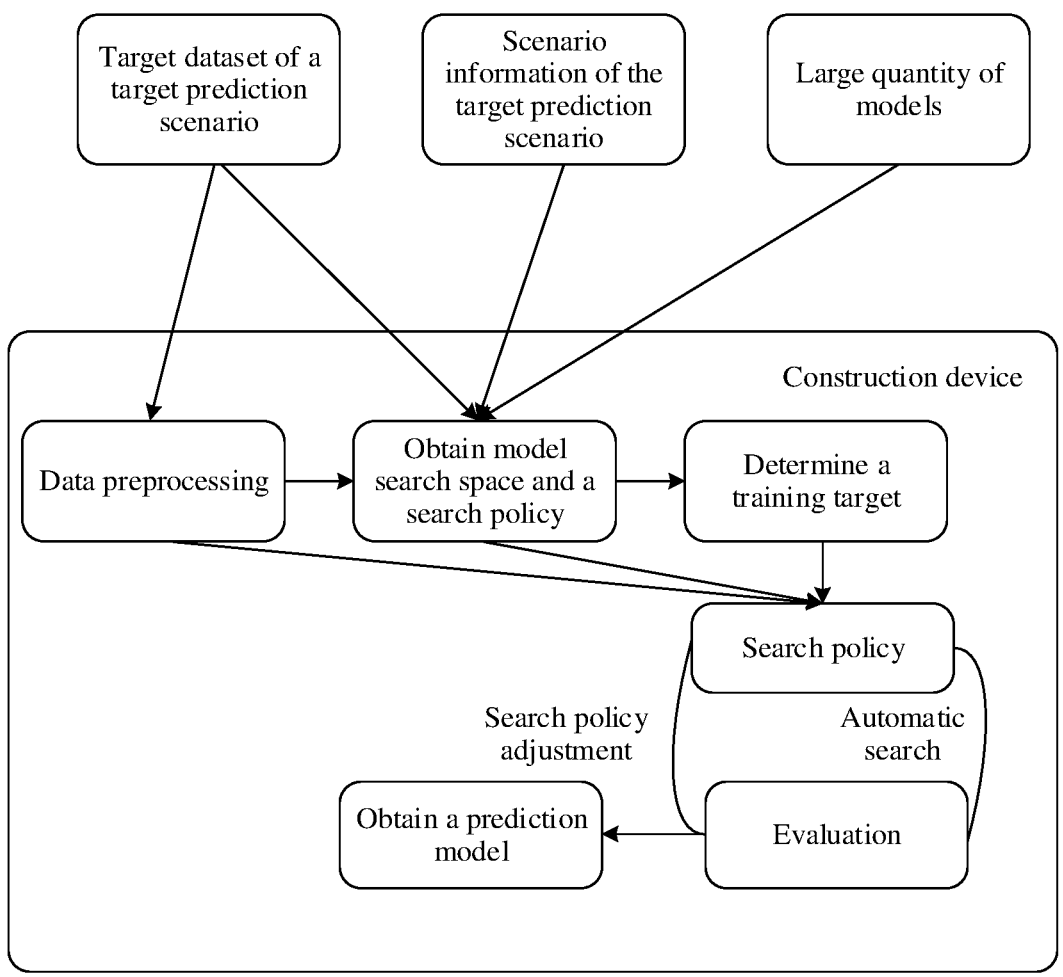
FIG. 6 is a block diagram of a procedure of prediction model construction according to an example embodiment of this application.

In addition, to better understand embodiments of this application, an embodiment of this application further provides a framework diagram of prediction model construction, as shown in FIG. 6.

It is assumed that a target dataset needs to be preprocessed. Data in the target dataset is preprocessed first, and model search space and a search policy are obtained based on the target dataset and/or scenario information of a target prediction scenario. Then, a construction device determines a training target of each of prediction models. The construction device trains the prediction models based on the training target, the search policy, and the model search space. The construction device evaluates the prediction models, to obtain a prediction model corresponding to the target prediction scenario. In addition, the construction device may further update the search policy based on evaluation results, to increase a speed of constructing the prediction model.

In addition, a scenario described in embodiments of this application is a prediction scenario, or certainly may be an anomaly detection scenario. In this case, the prediction model mentioned above is a prediction model for anomaly detection.

Figure 7:
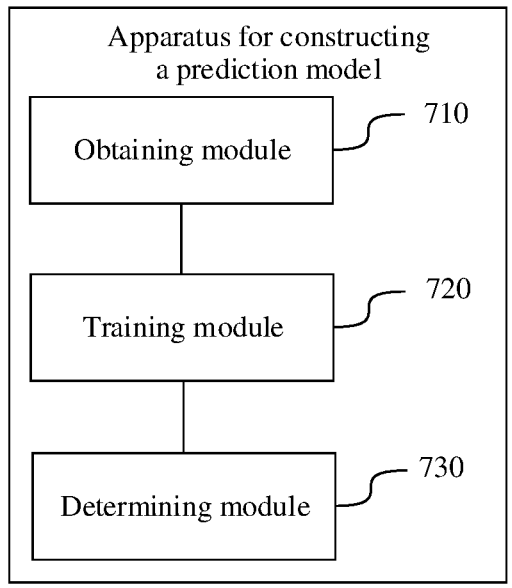
FIG. 7 is a schematic diagram of a structure of an apparatus for constructing a prediction model according to an example embodiment of this application.

FIG. 7 is a schematic diagram of a structure of an apparatus for constructing a prediction model according to an embodiment of this application. The apparatus may be implemented as a part of the apparatus or the entire apparatus by using software, hardware, or a combination thereof. The apparatus provided in this embodiment of this application may implement the procedure described in FIG. 4 in embodiments of this application. The apparatus includes an obtaining module 710, a training module 720, and a determining module 730.

The obtaining module 710 is configured to obtain, based on a target dataset of a target prediction scenario and/or scenario information of the target prediction scenario, model search space corresponding to the target prediction scenario, where the model search space includes models and hyperparameters, and may be specifically configured to implement an obtaining function in step 401 and an implicit step included in step 401.

The training module 720 is configured to perform model training based on the target dataset and the models and the hyperparameters that are included in the model search space, to obtain trained prediction models, and may be specifically configured to implement a training function in step 402 and an implicit step included in step 402.

The determining module 730 is configured to obtain, based on evaluation results of the trained prediction models, a prediction model corresponding to the target prediction scenario, and may be specifically configured to implement a determining function in step 403 and an implicit step included in step 403.

In a possible implementation, the obtaining module 710 is configured to:

obtain initial model search space, where the initial model search space is obtained by analyzing a historical dataset, and the historical dataset is the target dataset of the target prediction scenario, or data in the historical dataset is similar to data in the target dataset; and filter models and/or hyperparameters in the initial model search space based on the target dataset and/or the scenario information of the target prediction scenario, to obtain the model search space corresponding to the target prediction scenario, where the models in the model search space are all or a part of the models in the initial model search space, and the hyperparameters in the model search space are all or a part of the hyperparameters in the initial model search space; or obtain, from preset models and hyperparameters based on the target dataset of the target prediction scenario and/or the scenario information of the target prediction scenario, the model search space corresponding to the target prediction scenario.

In a possible implementation, the model in the model search space is a model that is in the initial model search space and whose feature of an applicable dataset is similar to a first feature of the target dataset, and the hyperparameter in the model search space is a hyperparameter that is in the initial model search space and whose feature of an applicable dataset is similar to the first feature of the target dataset;

the model in the model search space is a model that is in the initial model search space and whose information about an applicable scenario is similar to the scenario information of the target prediction scenario, and the hyperparameter in the model search space is a hyperparameter that is in the initial model search space and whose information about an applicable scenario is similar to the scenario information of the target prediction scenario; or the model in the model search space is a model in the initial model search space, where information about an applicable scenario of the model is similar to the scenario information of the target prediction scenario, and a feature of an applicable dataset of the model is similar to a first feature of the target dataset; and the hyperparameter in the model search space is a hyperparameter in the initial model search space, where information about an applicable scenario of the hyperparameter is similar to the scenario information of the target prediction scenario, and a feature of an applicable dataset of the hyperparameter is similar to the first feature of the target dataset.

In a possible implementation, the obtaining module 710 is configured to:

determine, based on the historical dataset, models and hyperparameters that correspond to the target prediction scenario, and form the initial model search space by using the determined models and hyperparameters; or send a model obtaining request to a cloud device, where the model obtaining request is for requesting to obtain the initial model search space; and receive the initial model search space sent by the cloud device.

In a possible implementation, the obtaining module 710 is configured to: obtain models and hyperparameters whose features of applicable datasets each are similar to a second feature of the target dataset, and determine the models and the hyperparameters as the models and the hyperparameters in the initial model search space corresponding to the target prediction scenario.

In a possible implementation, the second feature of the target dataset and the first feature of the target dataset are a same feature or different features.

In a possible implementation, the scenario information of the target prediction scenario includes a computing performance requirement and/or a prediction requirement, the computing performance requirement includes one or more of memory information, CPU information, or an inference speed, and the prediction requirement includes prediction duration and/or a prediction periodicity for performing prediction by using the prediction model corresponding to the target prediction scenario.

In a possible implementation, the first feature of the target dataset includes category information and/or statistics information, the category information includes one or more of periodicity information, fluctuation information, or sudden change information of a time series in the target dataset, and the statistics information includes one or more of a sampling interval, sampling duration, or a neglected collection status of the time series in the target dataset.

In a possible implementation, the determining module 730 is configured to: select, from the trained prediction models, a prediction model with an optimal evaluation result, and determine the prediction model as the prediction model corresponding to the target prediction scenario.

In a possible implementation, the obtaining module 710 is further configured to: before the trained prediction models are obtained based on the target dataset and the models and the hyperparameters that are included in the model search space, obtain a search policy corresponding to the target prediction scenario, where the search policy includes a model search policy.

The training module 720 is configured to:
search the model search space for the models and the hyperparameters according to the model search policy; and
perform model training based on the target dataset and the searched models and hyperparameters, to obtain the trained prediction models.

In a possible implementation, the search policy further includes a training policy.

The training module 720 is configured to: perform model training based on the target dataset, the training policy, and the searched models and hyperparameters, to obtain the trained prediction models.

In a possible implementation, the obtaining module 710 is configured to: determine, based on the target dataset, the search policy corresponding to the target prediction scenario.

Alternatively, the apparatus further includes: a sending module 740, configured to send a search policy obtaining request to the cloud device, where the search policy obtaining request is for requesting to obtain the search policy; and a receiving module, configured to receive the search policy sent by the cloud device.

In a possible implementation, the obtaining module 710 is further configured to: after the search policy corresponding to the target prediction scenario is obtained, adjust the search policy based on training experience of training the searched models.

Figure 8:
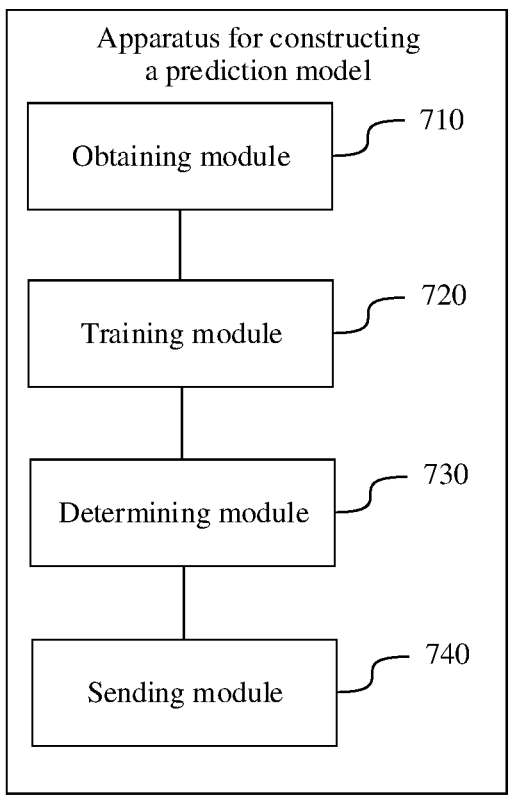
FIG. 8 is a schematic diagram of a structure of an apparatus for constructing a prediction model according to an example embodiment of this application.

In a possible implementation, as shown in FIG. 8, the apparatus further includes: the sending module 740, configured to send, to the cloud device, the prediction model corresponding to the target prediction scenario, the models and the hyperparameters that are used for training the prediction model corresponding to the target prediction scenario, and an identifier of the target prediction scenario.

In a possible implementation, the obtaining module 710 is further configured to: before the trained prediction models are obtained based on the target dataset and the models and the hyperparameters that are included in the model search space, obtain, based on the target dataset, a data preprocessing algorithm included in the model search space.

The training module 720 is configured to:
preprocess the target dataset according to the data preprocessing algorithm; and
perform model training based on a preprocessed target dataset and the models and the hyperparameters that are included in the model search space, to obtain the trained prediction models.

In embodiments of this application, division into the modules is an example, and is merely logical function division. During actual implementation, there may be another division. In addition, functional modules in embodiments of this application may be integrated into a processor, or each of the modules may exist alone physically, or two or more modules may be integrated into one module. The integrated module may be implemented in a form of hardware, or may be implemented in a form of a software functional module.

Figure 9:
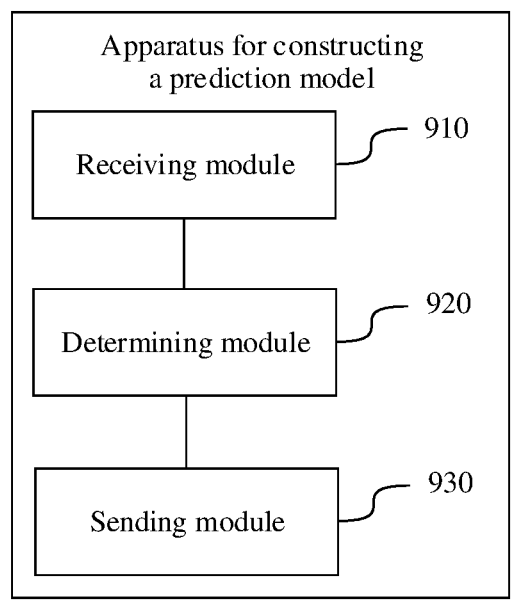
FIG. 9 is a schematic diagram of a structure of an apparatus for constructing a prediction model according to an example embodiment of this application.

FIG. 9 is a schematic diagram of a structure of an apparatus for constructing a prediction model according to an embodiment of this application. The apparatus may be implemented as a part of the apparatus or the entire apparatus by using software, hardware, or a combination thereof. The apparatus includes a receiving module 910, a determining module 920, and a sending module 930.

The receiving module 910 is configured to receive a model obtaining request sent by a construction device, where the model obtaining request is for requesting to obtain initial model search space corresponding to a target prediction scenario, and may be specifically configured to implement a receiving function of the apparatus for constructing a prediction model.

The determining module 920 is configured to determine, based on a historical dataset, models and hyperparameters that correspond to the target prediction scenario, where the historical dataset is a target dataset of the target prediction scenario, or data in the historical dataset is similar to data in a target dataset, and may be specifically configured to implement a determining function of the apparatus for constructing a prediction model.

The sending module 930 is configured to send the initial model search space to the construction device, where the initial model search space includes the models and the hyperparameters that correspond to the target prediction scenario, and may be specifically configured to implement a sending function of the apparatus for constructing a prediction model.

In a possible implementation, the determining module 920 is configured to: obtain models and hyperparameters whose features of applicable datasets each are similar to a second feature of the target dataset, and determine the models and the hyperparameters as the models and the hyperparameters in the initial model search space corresponding to the target prediction scenario.

In embodiments of this application, division into the modules is an example, and is merely logical function division. During actual implementation, there may be another division. In addition, functional modules in embodiments of this application may be integrated into a processor, or each of the modules may exist alone physically, or two or more modules may be integrated into one module. The integrated module may be implemented in a form of hardware, or may be implemented in a form of a software functional module.

All or some of the foregoing embodiments may be implemented by using software, hardware, firmware, or any combination thereof. When the software is used for implementation, all or some of the foregoing embodiments may be implemented in a form of a computer program product. The computer program product includes one or more computer instructions. When the computer program instructions are loaded and executed on a server or a terminal, all or some of the processes or functions according to embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk drive, a magnetic tape, or the like), an optical medium (for example, a digital video disk (DVD), or the like), or a semiconductor medium (for example, a solid-state drive, or the like).

What is claimed is:

1. A method comprising:
obtaining a search policy corresponding to a target prediction scenario, wherein the search policy comprises a model search policy;
obtaining, based on scenario information of the target prediction scenario or based on a target dataset of the target prediction scenario and the scenario information of the target prediction scenario, model search space corresponding to the target prediction scenario for which prediction is to be performed, wherein the model search space comprises models and hyperparameters;
performing model training based on the target dataset and the models and the hyperparameters in the model search space, to obtain trained prediction models, wherein performing the model training comprises:
searching the model search space for models and/or hyperparameters according to the model search policy; and
performing the model training based on the target dataset and the searched models and hyperparameters, to obtain the trained prediction models;
obtaining, based on evaluation results of the trained prediction models, a prediction model corresponding to the target prediction scenario from the trained prediction models; and
sending, to a cloud device, the prediction model corresponding to the target prediction scenario, the models and the hyperparameters in the model search space, and an identifier of the target prediction scenario;
wherein the scenario information of the target prediction scenario comprises a computing performance requirement and/or a prediction requirement, the computing performance requirement comprises one or more of memory information, central processing unit (CPU) information, or an inference speed, and the prediction requirement comprises prediction duration and/or a prediction periodicity for performing prediction for the target prediction scenario.

2. The method according to claim 1, wherein obtaining the model search space corresponding to the target prediction scenario comprises:
obtaining, from preset models and hyperparameters and based on the target dataset of the target prediction scenario and/or the scenario information of the target prediction scenario, the model search space corresponding to the target prediction scenario; or obtaining initial model search space corresponding to the target prediction scenario, wherein the initial model search space is obtained by analyzing a historical dataset, and the historical dataset is the target dataset of the target prediction scenario, or data in the historical dataset is similar to data in the target dataset; and
filtering models and/or hyperparameters in the initial model search space based on the target dataset and/or the scenario information of the target prediction scenario, to obtain the model search space corresponding to the target prediction scenario, wherein the models in the model search space are all or a part of the models in the initial model search space, and the hyperparameters in the model search space are all or a part of the hyperparameters in the initial model search space.

3. The method according to claim 2, wherein:
a model in the model search space is a model that is in the initial model search space and whose feature of an applicable dataset is similar to a first feature of the target dataset, and a hyperparameter in the model search space is a hyperparameter that is in the initial model search space and whose feature of an applicable dataset is similar to the first feature of the target dataset; or
a model in the model search space is a model that is in the initial model search space and whose information about an applicable scenario is similar to the scenario information of the target prediction scenario, and a hyperparameter in the model search space is a hyperparameter that is in the initial model search space and whose information about an applicable scenario is similar to the scenario information of the target prediction scenario; or
a model in the model search space is a model in the initial model search space, wherein information about an applicable scenario of the model is similar to the scenario information of the target prediction scenario, and a feature of an applicable dataset of the model is similar to a first feature of the target dataset; and a hyperparameter in the model search space is a hyperparameter in the initial model search space, wherein information about an applicable scenario of the hyperparameter is similar to the scenario information of the target prediction scenario, and a feature of an applicable dataset of the hyperparameter is similar to the first feature of the target dataset.

4. The method according to claim 3, wherein the first feature of the target dataset comprises category information and/or statistics information, the category information comprises one or more of periodicity information, fluctuation information, or sudden change information of a time series in the target dataset, and the statistics information comprises one or more of a sampling interval, sampling duration, or a neglected collection status of the time series in the target dataset.

5. The method according to claim 2, wherein obtaining the initial model search space comprises:
determining, based on the historical dataset, first models and first hyperparameters that correspond to the target prediction scenario, and forming the initial model search space using the determined first models and first hyperparameters; or
sending a model obtaining request to the cloud device, the model obtaining request requesting to obtain the initial model search space; and receiving the initial model search space sent by the cloud device.

6. The method according to claim 5, wherein determining, based on the historical dataset, the first models and the first hyperparameters that correspond to the target prediction scenario comprises:

obtaining second models and second hyperparameters whose features of applicable datasets each are similar to a second feature of the target dataset, and determining the second models and the second hyperparameters as the first models and the first hyperparameters in the initial model search space corresponding to the target prediction scenario.

7. The method according to claim 1, wherein the search policy further comprises a training policy; and performing the model training to obtain the trained prediction models comprises:

performing the model training based on the target dataset, the training policy, and the searched models and hyperparameters, to obtain the trained prediction models.

8. The method according to claim 1, wherein obtaining the search policy corresponding to the target prediction scenario comprises:

determining, based on the target dataset, the search policy corresponding to the target prediction scenario.

9. The method according to claim 1, wherein after obtaining the search policy corresponding to the target prediction scenario, the method further comprises:

adjusting the search policy based on training experience of training the searched models.

10. The method according to claim 1, wherein obtaining the search policy corresponding to the target prediction scenario comprises:

sending a search policy obtaining request to the cloud device, the search policy obtaining request requesting to obtain the search policy; and receiving the search policy sent by the cloud device.

11. A device comprising:

at least one processor; and a non-transitory memory, coupled to the at least one processor and configured to store storing instructions that, when executed by the at least one processor, cause the device to:

obtain a search policy corresponding to a target prediction scenario, wherein the search policy comprises a model search policy;

obtain, based on scenario information of the target prediction scenario or based on a target dataset of the target prediction scenario and the scenario information of the target prediction scenario, model search space corresponding to the target prediction scenario in which prediction is to be performed, wherein the model search space comprises models and hyperparameters;

perform model training based on the target dataset and the models and the hyperparameters that are comprised in the model search space, to obtain trained prediction models, wherein performing the model training comprises:

searching the model search space for models and/or hyperparameters according to the model search policy; and performing the model training based on the target dataset and the searched models and hyperparameters, to obtain the trained prediction models;

obtain, based on evaluation results of the trained prediction models, a prediction model corresponding to the target prediction scenario from the trained prediction models; and send, to a cloud device, the prediction model corresponding to the target prediction scenario, the models and the hyperparameters in the model search space, and an identifier of the target prediction scenario; and wherein the scenario information of the target prediction scenario comprises a computing performance requirement and/or a prediction requirement, the computing performance requirement comprises one or more of memory information, central processing unit (CPU) information, or an inference speed, and the prediction requirement comprises prediction duration and/or a prediction periodicity for performing prediction for the target prediction scenario.

12. The device according to claim 11, wherein when executed by the at least one processor, the instructions cause the device to:

obtain, from preset models and hyperparameters and based on the target dataset of the target prediction scenario and/or the scenario information of the target prediction scenario, the model search space corresponding to the target prediction scenario; or obtain initial model search space corresponding to the target prediction scenario, wherein the initial model search space is obtained by analyzing a historical dataset, and the historical dataset is the target dataset of the target prediction scenario, or data in the historical dataset is similar to data in the target dataset; and filter models and/or hyperparameters in the initial model search space based on the target dataset and/or the scenario information of the target prediction scenario, to obtain the model search space corresponding to the target prediction scenario, wherein the models in the model search space are all or a part of the models in the initial model search space, and the hyperparameters in the model search space are all or a part of the hyperparameters in the initial model search space.

13. The device according to claim 12, wherein:

a model in the model search space is a model that is in the initial model search space and whose feature of an applicable dataset is similar to a first feature of the target dataset, and a hyperparameter in the model search space is a hyperparameter that is in the initial model search space and whose feature of an applicable dataset is similar to the first feature of the target dataset.

14. The device according to claim 12, wherein when executed by the at least one processor, the instructions cause the device to:

determine, based on the historical dataset, first models and first hyperparameters that correspond to the target prediction scenario, and form the initial model search space using the determined first models and first hyperparameters.

15. The device according to claim 14, wherein when executed by the at least one processor, the instructions cause the device to:

obtain second models and second hyperparameters whose features of applicable datasets each are similar to a second feature of the target dataset, and determine the second models and the second hyperparameters as the first models and the first hyperparameters in the initial model search space corresponding to the target prediction scenario.

16. The device according to claim 12, wherein when executed by the at least one processor, the instructions cause the device to:

send a model obtaining request to the cloud device, the model obtaining request requesting to obtain the initial model search space; and receive the initial model search space sent by the cloud device.

17. The device according to claim 12, wherein:

a model in the model search space is a model that is in the initial model search space and whose information about an applicable scenario is similar to the scenario information of the target prediction scenario, and a hyperparameter in the model search space is a hyperparameter that is in the initial model search space and whose information about an applicable scenario is similar to the scenario information of the target prediction scenario.

18. The device according to claim 12, wherein:

a model in the model search space is a model in the initial model search space, wherein information about an applicable scenario of the model is similar to the scenario information of the target prediction scenario, and a feature of an applicable dataset of the model is similar to a first feature of the target dataset; and a hyperparameter in the model search space is a hyperparameter in the initial model search space, wherein information about an applicable scenario of the hyperparameter is similar to the scenario information of the target prediction scenario, and a feature of an applicable dataset of the hyperparameter is similar to the first feature of the target dataset.

19. The device according to claim 11, wherein the search policy further comprises a training policy; and wherein when executed by the at least one processor, the instructions cause the device to:

perform the model training based on the target dataset, the training policy, and the searched models and hyperparameters, to obtain the trained prediction models.

20. The device according to claim 11, wherein when executed by the at least one processor, the instructions further cause the device to:

after obtaining the search policy corresponding to the target prediction scenario, adjust the search policy based on training experience of training the searched models.

* * * * *